(12) United States Patent
McCormick et al.

(10) Patent No.: US 9,032,505 B1
(45) Date of Patent: May 12, 2015

(54) CREATING SECURE CONNECTIONS BETWEEN DISTRIBUTED COMPUTING DEVICES

(71) Applicant: Wells Fargo Bank, N.A., San Francisco, CA (US)

(72) Inventors: Michael Thomas McCormick, Roseville, MN (US); Jonathan Francis Savage, Charlotte, NC (US); Michael Charles Dayton, Chaska, MN (US); Robert Henry Hughes, Bloomington, MN (US); Michael Alan Krumpus, Plymouth, MN (US); Mathew Loesch, Rosemount, MN (US); Nathan Thangavadivel Suri, Harrisburg, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 119 days.

(21) Appl. No.: 13/839,739

(22) Filed: Mar. 15, 2013

(51) Int. Cl.
*H04L 29/06* (2006.01)

(52) U.S. Cl.
CPC ..................................... *H04L 63/18* (2013.01)

(58) Field of Classification Search
CPC .... H04L 63/0272; H04L 63/08; H04L 63/201
USPC ......................................... 726/22, 25, 15, 14
See application file for complete search history.

(56) References Cited

U.S. PATENT DOCUMENTS

| | | | |
|---|---|---|---|
| 6,266,707 B1 | 7/2001 | Boden et al. | |
| 6,779,035 B1 | 8/2004 | Gbadegesin | |
| 6,957,199 B1 | 10/2005 | Fisher | |
| 7,089,328 B1 | 8/2006 | O'Rourke et al. | |
| 7,444,522 B1 | 10/2008 | Chang et al. | |
| 7,565,326 B2 | 7/2009 | Randle et al. | |
| 7,567,504 B2 | 7/2009 | Darling et al. | |
| 7,739,744 B2 | 6/2010 | Burch et al. | |
| 7,900,247 B2 | 3/2011 | Chong | |
| 7,930,542 B2 | 4/2011 | Ganesan | |
| 7,953,087 B1 | 5/2011 | Bollay et al. | |
| 8,028,329 B2 | 9/2011 | Whitcomb | |

(Continued)

FOREIGN PATENT DOCUMENTS

EP   1668455 A2   6/2006

OTHER PUBLICATIONS

FPKIPA, "SSL/TLS Inspection and Mutually Authenticated SSL/TLS," 2009, 4 pages.

(Continued)

*Primary Examiner* — Edward Zee
(74) *Attorney, Agent, or Firm* — Merchant & Gould P.C.

(57) ABSTRACT

A computing device includes: a processing unit; and memory encoding instructions that, when executed by the processing unit, cause the processing unit to: receive a request from a client computing device; establish a first secured connection to the client computing device; select a server computing device from a plurality of server computing devices to service the request from the client computing device, selection being made based, at least in part, upon load balancing considerations; establish a second secured connection to the server computing device, the second secured connection being separate from the first secured connection; and allow the client computing device to securely communicate with the server computing device through the first and second secured connections.

15 Claims, 4 Drawing Sheets

(56) References Cited

U.S. PATENT DOCUMENTS

| | | | |
|---|---|---|---|
| 8,341,714 B2 | 12/2012 | MÜLler et al. | |
| 8,566,452 B1 * | 10/2013 | Goodwin et al. | 709/227 |
| 2003/0130832 A1 | 7/2003 | Schulter et al. | |
| 2005/0132201 A1 | 6/2005 | Pitman et al. | |
| 2007/0271453 A1 | 11/2007 | Pohja et al. | |
| 2007/0282951 A1 | 12/2007 | Selimis et al. | |
| 2010/0030839 A1 * | 2/2010 | Ceragioli et al. | 709/201 |
| 2012/0331088 A1 | 12/2012 | O'Hare et al. | |

OTHER PUBLICATIONS

Fpkipa, "SS/TLS Inspection and Mutually Authenticated SSL/TLS," 2009, 4 pages.

Park et al., "Smart Certificates: Extending X.509 for Secure Attribute Services on the Web," 1999, 12 pages.

* cited by examiner

CREATING SECURE CONNECTIONS BETWEEN DISTRIBUTED COMPUTING DEVICES

BACKGROUND

Since the dawn of distributed computing, there has been a need for message senders and receivers to mutually authenticate each other, authorize requests, and protect confidentiality of sensitive message data. This can be particularly important in scenarios involving sensitive data, such as financial transactions. Existing legacy processes for creating secure connections can result in less security than preferred or require undesired overhead and result in inflexibility in the connected architectures.

SUMMARY

In one aspect, a computing system includes: a computing device including: a processing unit; and memory encoding instructions that, when executed by the processing unit, cause the processing unit to: receive a request from a client computing device; establish a first secured connection to the client computing device; select a server computing device from a plurality of server computing devices to service the request from the client computing device, selection being made based, at least in part, upon load balancing considerations; establish a second secured connection to the server computing device, the second secured connection being separate from the first secured connection; and allow the client computing device to securely communicate with the server computing device through the first and second secured connections.

In another aspect, a method for forming a secure connection between a client computing device and a server computing device includes: receiving a request from a client computing device; establishing a first secured connection to the client computing device; selecting the server computing device from a plurality of server computing devices to service the request from the client computing device, selection being made based, at least in part, upon load balancing considerations; establishing a second secured connection to the server computing device, the second secured connection being separate from the first secured connection; and allowing the client computing device to communicate with the server computing device through the first and second secured connections.

In yet another aspect, a method for forming a secure connection between a client computing device and a server computing device includes: receiving a request from a client computing device; establishing a first secured connection to the client computing device using a secure protocol; selecting the server computing device from a plurality of server computing devices to service the request from the client computing device, selection being made based, at least in part, upon load balancing considerations; establishing a second secured connection to the server computing device using Internet Protocol filtering, the second secured connection being separate from the first secured connection; and allowing the client computing device to communicate with the server computing device through the first and second secured connections.

DETAILED DESCRIPTION

The examples described herein are related to systems and methods for negotiating a secure connection between a client and a server.

In some examples, the connection between the client and the server is negotiated through a load balancer. In creating the connection, a first secure connection is formed between the client and the load balancer. Further, a second secure connection is formed between the load balancer and the server. The client is thereupon able to communicate securely with the server through the first and second secure connections. Further, should the performance of the server become compromised, the load balancer can securely connect to a second server to allow the client to communicate securely with the second server.

In some examples, the secure connection between the client and the load balancer is created through the client using an application certificate that identifies a particular application on the client. Assuming that the application has authorization to communicate with the requested server, the load balancer thereupon creates a secure connection between the application and the server.

Variations and other configurations beyond the examples described above are possible. For example, in one embodiment, the secure connection between the client and the load balancer can be accomplished using the application certificate. In an alternative embodiment, the secure connection between the client and the load balancer can be accomplished using a more traditional certificate that authenticates the client to the load balancer.

Additional details regarding these examples are provided below.

Figure 1:
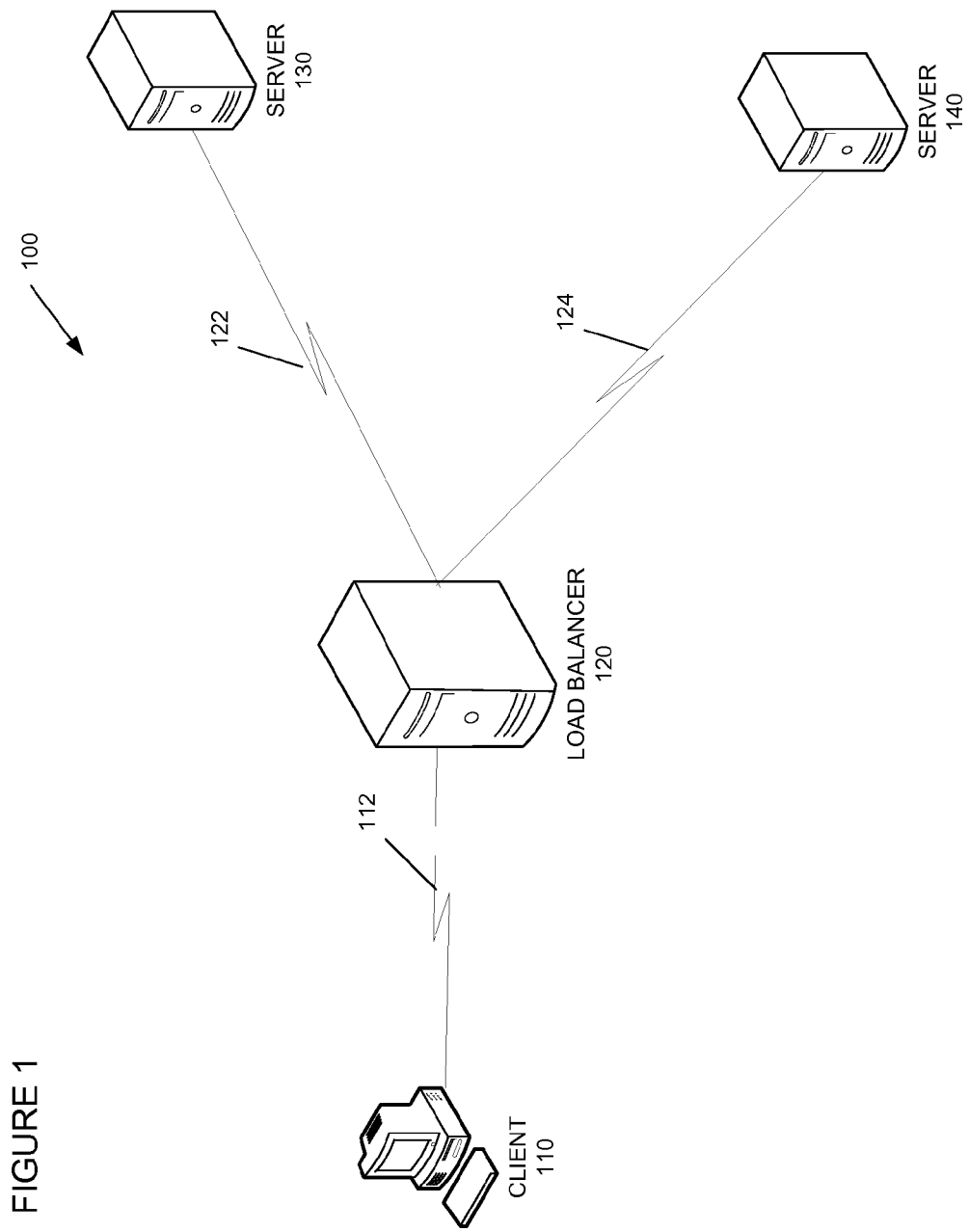
FIG. 1 shows an example computer system environment.

Referring now to FIG. 1, an example system 100 is shown. The system 100 includes a client 110, a load balancer 120, and servers 130, 140. A single client and load balancer and two servers are shown for the sake of clarity. In real-world applications, it is typical to have multiple clients, load balancers, and servers distributed across geographic areas, as needed, to provide required service standards and redundancies.

In this example, the client 110 is a computing device. The computing device runs one or more applications that are used to access and manipulate data stored on servers 130, 140. Examples of such applications are financial applications that accomplish tasks such as accessing account balances and transferring funds between accounts. Although this example is described in the context of the financial industry, the concepts are not so limited and are equally applicable to other scenarios.

The load balancer 120 is a computing device that facilitates the connection between the client 110 and the servers 130, 140. One function performed by the load balancer 120 is to receive a request from the client 110 and to select one of the servers 130, 140 to service the request. This selection is typically accomplished based upon the current loads on the servers 130, 140. For example, if the server 130 is overloaded with requests at a given point in time, the load balancer 120 may route a request from the client 110 to the server 140. In this manner, the load balancer acts as a middle-man that balances the loads between the servers 130, 140, sometimes referred to as load balancing.

In this example, the load balancer 120 is a BIG-IP Local Traffic Manager manufactured by F5 of Seattle, Wash. Other types of computing devices can be used.

The servers 130, 140 are computing devices that perform tasks requested by the client 110. For example, the servers 130, 140 can include one or more databases with financial information, applications, and/or middleware that can be accessed by the client 110. In some examples, the servers 130, 140 are redundant, in that either of the servers 130, 140 can handle a given request by the client 110. In such a scenario, as described above, the load balancer 120 selects one of the servers 130, 140 to handle a given request from the client 110.

In these examples, the client 110, the load balancer 120, and the servers 130, 140 are computing devices that each includes one or more processing units and computer readable media. Computer readable media includes physical memory such as volatile memory (such as RAM), non-volatile memory (such as ROM, flash memory, etc.) or some combination thereof. Additionally, the computing devices can include mass storage (removable and/or non-removable) such as a magnetic or optical disks or tape. An operating system, such as Linux or Windows, and one or more application programs can be stored on the mass storage device. The computing devices can include input devices (such as a keyboard and mouse) and output devices (such as a monitor and printer).

The computing devices also include network connections to other devices, computers, networks, servers, etc. In example embodiments, the computing devices communicate with one another through one or more networks, such as a local area network (LAN), a wide area network (WAN), the Internet, or a combination thereof. Communications can be implemented using wired and/or wireless technologies.

In this example, the client 110 is connected to the load balancer 120 by a communication channel 112. Likewise, the load balancer 120 is connected to the servers 130, 140 by communication channels 122, 124, respectively. The processes for establishing these connections in a secure manner are described below.

Figure 2:
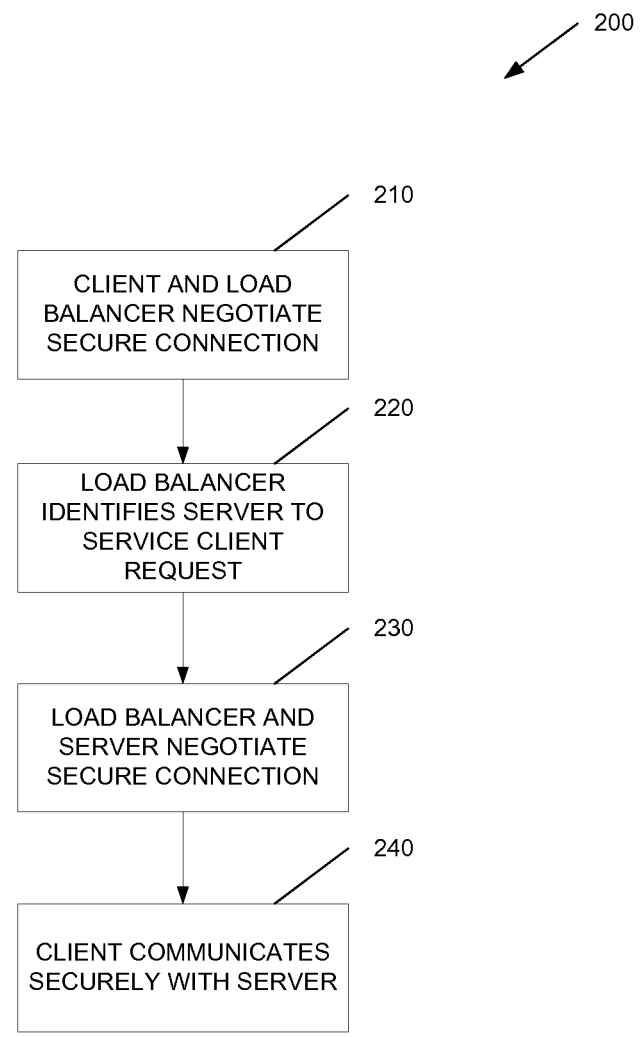
FIG. 2 shows an example method for negotiating a secure connection between a client and a server shown in FIG. 1.

Referring now to FIG. 2, an example method 200 for securing a connection from the client 110 to the server 130 is shown.

Initially, at operation 210, the client 110 negotiates a secure connection with the load balancer 120 over the communication channel 112.

This can be accomplished using various mechanisms. In one example, the secure connection is negotiated using the Secure Sockets Layer (SSL) or Mutually Authenticated SSL (MASSL) protocols, by which both the client and server are authenticated. In other examples, Transport Layer Security (TLS-RFC 5246) can also be used. This can involve authentication of the client 110 by the load balancer 120. In another example (see FIG. 4), this can involve authentication of a particular application running on the client 110. In such an example, a secure connection is created between the application on the client 110 and the load balancer 120.

Once the secure connection between the client 110 and the load balancer 120 is established, control is passed to operation 220. At operation 220, the load balancer 120 identifies a server to service the request from the client 110. In the example, this involves selecting between the servers 130, 140 using criteria such as that described above.

Assuming that the load balancer 120 selects the server 130 in this example, control is then passed to operation 230. At operation 230, the load balancer 120 negotiates a secure connection with the server 130.

This secure connection can be accomplished using various mechanisms. In one example, the secure connection is formed using Internet Protocol (IP) filtering, which is a technique that compares the IP address of the load balancer 120 to a known list of addresses that are accepted for connection. If the IP address is on that list (i.e., white-listed), the connection is allowed; otherwise, it is refused.

In such a scenario, a "strong" IP filter can be employed that requires certain other criteria to avoid "spoofing," such as: (i) require white-listed nodes to be production servers in approved environments; (ii) require access only on certain ports; (iii) use of random TCP sequence numbers by operating systems; and/or (iv) configure routers in a robust manner.

Once the communication channel 122 between the load balancer 120 and the server 130 is secured, control is passed to operation 240, and the client 110 can thereupon communicate with the server 130 in a secure manner. This secure connection allows the client 110 to make requests and receive responses from the server 130.

Figure 3:
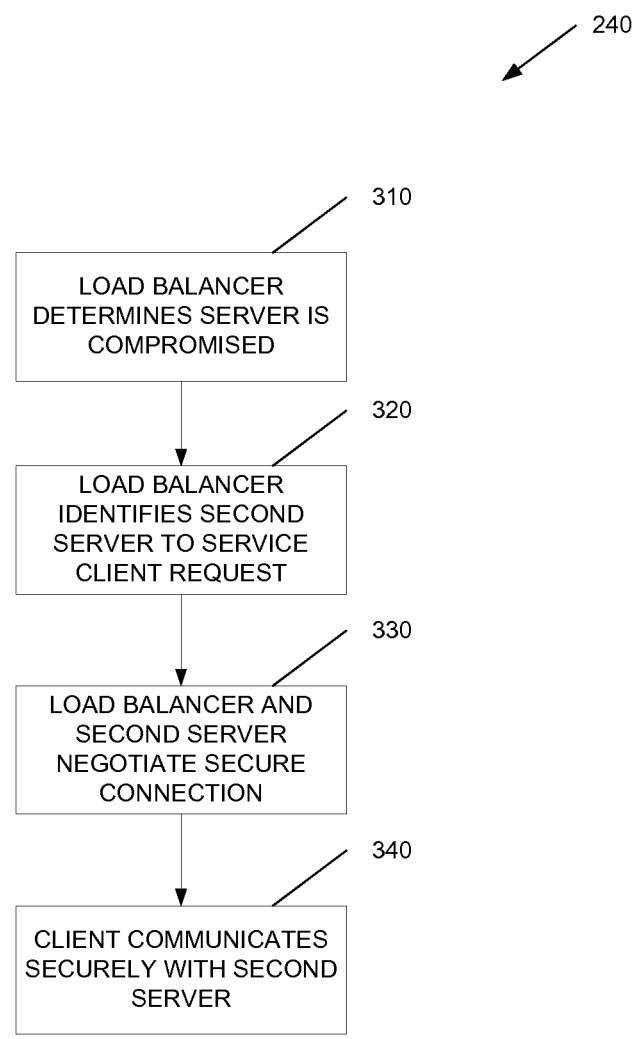
FIG. 3 shows an example method for negotiating a second secure connection between the client and a server of FIG. 2.

Referring now to FIG. 3, additional details regarding the operation 240 of the method 200 are shown. Specifically, during secure communications between the client 110 and the server 130, conditions may change.

For example, the server 130 could become compromised through overloading or, in an extreme case, crashing or otherwise go offline. In addition, the connection between the load balancer 120 and the server 130 could be compromised, either digitally or mechanically (e.g., if a fiber optic cable between the nodes is cut).

In one or more of such scenarios, the load balancer 120 determines that the server 130 has become compromised at operation 310. This determination could be made, for example, by setting a certain time-out period. If the server 130 fails to respond to requests within the given time-out period, the load balancer 120 can determine that the server 130 has become compromised.

Next, at operation 320, the load balancer 120 identifies another server that can accommodate the client 110 requests. In this example, the load balancer 120 selects the server 140 (in real-world examples, an entire geographically-distributed server farm may be available to the load balancer).

Next, at operation 330, the load balancer 120 and the server 140 negotiate a secure connection on the communication channel 124 using one or more mechanisms, such as IP filtering or the SSL protocol.

Finally, at operation 340, the client 110 is able to communicate securely with the server 140 over communication channels 112, 124.

This is accomplished without a significant interruption with service with respect to the client 110, such that the secure connection between the client 110 and the load balancer 120 does not need to be renegotiated. Since the load balancer 120 controls the connection between the load balancer 120 and the servers 130, 140, the load balancer 120 is able to change the connection when conditions at the servers 130, 140 change. This allows the load balancer 120 to efficiently handle changes to the system 100.

Figure 4:
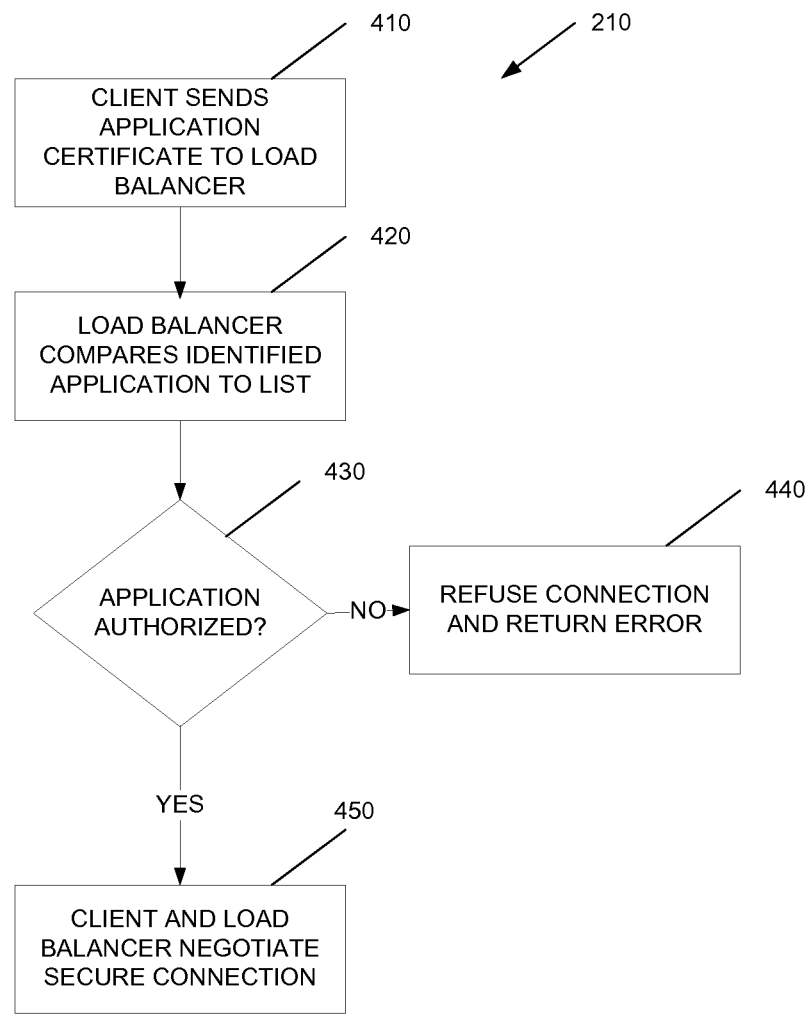
FIG. 4 shows an example method for negotiating a secure connection between a client and a load balancer shown in FIG. 1.

Referring now to FIG. 4, in some examples, the secure connection between the client 110 and the load balancer 120 is accomplished using other mechanisms.

In this example, the operation 210 of the method 200 is modified such that the client 110 uses an application certificate when making SSL requests to the load balancer 120. The application certificate enables application-based authentication and access control without necessarily requiring the overhead of traditional white lists commonly associated with mutual SSL. In this methodology, the application running on the client 110 is authenticated, rather than the client 110 itself.

In this example, the application certification is an X.509 certificate. Certain fields of the X.509 certificate are populated with values that allow for authentication of the application.

Specifically, the organizational unit (OU) field is populated with a value to indicate that the certificate is an application certificate. In this example, the value is "APP" to indicate that the certificate is an application certificate. In one embodiment, another value (e.g., "TESTAPP") can be used to indicate a test application certificate for use in testing functionality of the system 100.

In addition, a second OU field is populated with an identifier for the particular application. In this example, the identifier can be an alphanumeric or numeric identifier for the particular application.

In one example, this section of the application certificate looks as follows:

OU=APP,

OU=<AppID>,

In the example, the AppID is the identifier for the application (e.g., "55" could be used to designate a particular application). These are example field types; other mechanisms to accomplish the identification of the application can be used.

To accomplish authentication of the application, the client 110 sends the application certificate with these fields to the load balancer 120 at operation 410.

Next, at operation 420, the load balancer 120 identifies the request as including an application certificate by reading the first field OU=APP. Thereupon, the load balancer 120 compares the AppID in the second OU field of the application certificate to a list of trusted client applications.

In the event of a mismatch (i.e., the AppID is not found in the list of trusted client applications), the request from the client 110 fails at operation 430. Upon failure, the load balancer 120 refuses or otherwise ignores the request from the client 110 and returns an error code in operation 440. In one example, the error code that is returned is specific so that trouble-shooting is made easier. Examples of such error codes include the following:

| Code | Explanation |
| --- | --- |
| 550 | SSL negotiation used an invalid client application certificate. |
| 551 | SSL negotiation used an unauthorized AppID. |
| 554 | SSL negotiation used a personal certificate. Validate client certificate. |
| 555 | SSL negotiation used a non-production certificate. Validate client certificate. |
| 556 | SSL negotiation used a production certificate in non-production. Validate client certificate. |
| 559 | Error in security device configuration or software. |

In one example, the error codes are returned as an HTTP status code.

Alternatively, if the AppID does match an entry in the list, control is passed to operation 450, and the secure connection between the application on the client 110 and the load balancer 120 is negotiated.

The use of application certificates as described in FIG. 4 can be advantageous for several reasons. For example, the use of AppIDs and a white list can be easier to maintain than client-based authentication, which requires each certificate to be tracked. Instead, only authorized applications need to be tracked on the white list, regardless of client origin. In addition, the use of application certificates can be leveraged for other architectures. Examples include use in other web services authentication, such as WS-security X.509 token profiles, as well as to secure other types of application-to-application communications, such as Secure MQ messaging or FTPS-based file transfers.

Other examples for securing the connections between the client and the servers are also possible. For example, in an alternative embodiment, the client and load balancer can use MASSL to negotiate the secure connection on the communication channel 112. Similarly, the connection between the load balancer and the servers over communication channels 122, 124 can be negotiated using both IP filtering and SSL.

In yet another example, dual communication paths can be created along the communication channel 122, 124. For instance, more secure communications can be conducted over a dual IP filtered+SSL connection, while less secure communications can be done over an IP filtered connection. Finally, for communications involving highly-sensitive or secure information, the connections between both the client and load balancer and the load balancer and servers can be negotiated using MASSL.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A computing system, comprising:
  a computing device including:
    a processing unit; and
    memory encoding instructions that, when executed by the processing unit, cause the processing unit to:
      receive a request from a client computing device;
      establish a first secured connection to the client computing device, the first secured connection being negotiated using a Mutually Authenticated Secure Sockets Layer protocol;
      select a server computing device from a plurality of server computing devices to service the request from the client computing device, selection being made based, at least in part, upon load balancing considerations;
      establish a second secured connection to the server computing device, the second secured connection being separate from the first secured connection, and the second secured connection being created by Internet Protocol filtering; and
      allow the client computing device to securely communicate with the server computing device through the first and second secured connections.

2. The system of claim 1, further comprising the server computing device.

3. The system of claim 1, further comprising the client computing device.

4. The system of claim 1, wherein the computing device is a load balancing computing device.

5. The system of claim 1, wherein the computing device is further configured to:
  determine when the server computing device is compromised;
  select another server computing device from the plurality of server computing devices;

establish a third secured connection to the another server computing device, the third secured connection being separate from the first secured connection; and allow the client computing device to communicate with the another server computing device through the first and third secured connections.

6. The system of claim 1, wherein the computing device receives an application certificate to negotiate the first secured connection.

7. The system of claim 6, wherein the application certificate identifies a specific application on the client computing device.

8. A method for forming a secure connection between a client computing device and a server computing device, the method comprising:

receiving a request from the client computing device;

receiving an application certificate to negotiate a first secured connection, wherein the application certificate identifies a specific application on the client computing device, establishing the first secured connection to the client computing device;

selecting the server computing device from a plurality of server computing devices to service the request from the client computing device, selection being made based, at least in part, upon load balancing considerations;

establishing a second secured connection to the server computing device, the second secured connection being separate from the first secured connection; and allowing the client computing device to communicate with the server computing device through the first and second secured connections.

9. The method of claim 8, further comprising:

determining when the server computing device is compromised;

selecting another server computing device from the plurality of server computing devices;

establishing a third secured connection to the another server computing device, the third secured connection being separate from the first secured connection; and allowing the client computing device to communicate with the another server computing device through the first and third secured connections.

10. The method of claim 8, wherein the first secured connection is negotiated using a Secure Sockets Layer protocol.

11. The method of claim 8, wherein the second secured connection is created by Internet Protocol filtering.

12. The method of claim 8, wherein the second secured connection is negotiated using a Mutually Authenticated Secure Sockets Layer protocol.

13. A method for forming a secure connection between a client computing device and a server computing device, the method comprising:

receiving a request from the client computing device;

establishing a first secured connection to the client computing device using a secure protocol;

selecting the server computing device from a plurality of server computing devices to service the request from the client computing device, selection being made based, at least in part, upon load balancing considerations;

establishing a second secured connection to the server computing device using Internet Protocol filtering, the second secured connection being separate from the first secured connection; and allowing the client computing device to communicate with the server computing device through the first and second secured connections.

14. The method of claim 13, further comprising:

determining when the server computing device is compromised;

selecting another server computing device from the plurality of server computing devices;

establishing a third secured connection to the another server computing device, the third secured connection being separate from the first secured connection; and allowing the client computing device to communicate with the another server computing device through the first and third secured connections.

15. The method of claim 13, further comprising receiving an application certificate to negotiate the first secured connection, wherein the application certificate identifies a specific application on the client computing device.

\* \* \* \* \*